Dec. 7, 1965
H. E. BENSON
3,222,147
PROCESS FOR THE PREPARATION OF MIXTURES OF
HYDROGEN, CARBON MONOXIDE AND METHANE
Filed Feb. 12, 1962
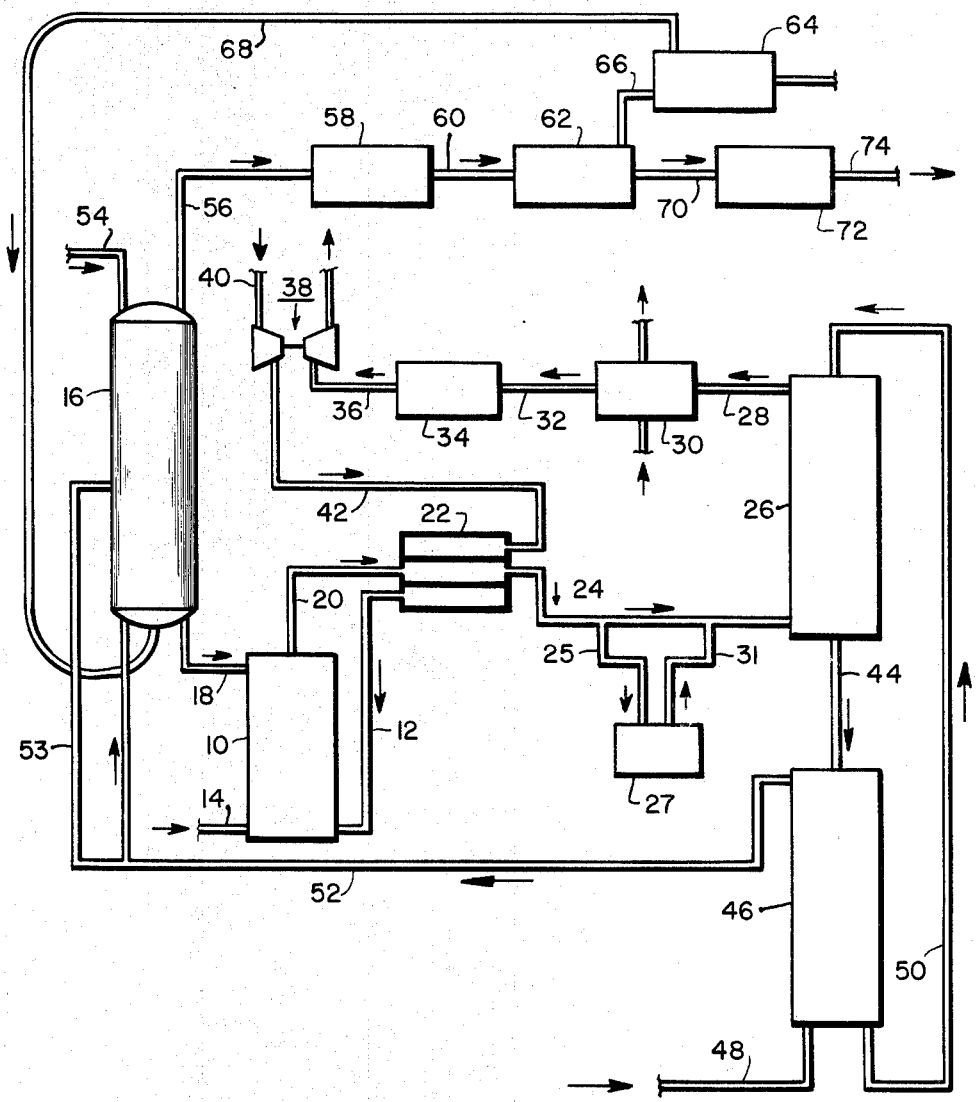
INVENTOR.
*Homer E. Benson*
BY
*Webb Mackey & Burden*
HIS ATTORNEYS 3,222,147
PROCESS FOR THE PREPARATION OF MIXTURES OF HYDROGEN, CARBON MONOXIDE AND METHANE
Homer E. Benson, Pittsburgh, Pa., assignor to Con-Gas Service Corporation, Pittsburgh, Pa., a corporation of Delaware
Filed Feb. 12, 1962, Ser. No. 172,687
7 Claims. (Cl. 48—197)

This invention relates to a process for preparing a mixture of gases comprising hydrogen, carbon monoxide and methane from carbonaceous materials and, more particularly, to a process for preparing high B.t.u. gas from carbonaceous solid fuel by reacting the carbonaceous solid fuel with both hydrogen and steam, the hydrogen being obtained from the oxidizing reaction of a metal and steam.

It has been proposed in the past to gasify carbonaceous solids such as coal, lignite or the like in the presence of other gases to obtain more useful gases for further synthesis or as a source of high B.t.u. gas. It is well known that carbonaceous solids react with hydrogen under pressure to produce methane gas. It is also well known that carbonaceous solids react with steam at high temperatures to produce hydrogen and carbon monoxide which may, by means of a methanation process, be converted catalytically to methane. The gasification of carbonaceous material in the presence of hydrogen presents two basic problems that affect the economics of the overall process. The first problem encountered in the hydrogenation of carbonaceous solids is the exothermic properties of the reaction. The second and more important problem encountered is the cost of the hydrogen required for the process.

It has been suggested in the past to employ conventional heat transfer means to control the exothermic reaction that is encountered in the hydrogenation reaction. Such conventional heat exchange means, such as cooling coils or the like, are positioned in the gasification reactor and control the temperature of the reaction by removing the heat generated in the reactor. It is apparent that the required heat exchange apparatus adds to the cost of the process and presents serious process limitations. I have eliminated this heat exchange problem by concurrently, in the same gasification vessel, carrying out the exothermic hydrogenation reaction and an endothermic water gas reaction. Therefore, by controlling the relative rate of the hydrogenation reaction and the water gas reaction, it is possible to obtain a substantially thermoneutral reaction wherein the carbonaceous solids react in the same vessel with the hydrogen to produce methane and with the steam to produce hydrogen and carbon monoxide. This substantially thermoneutral reaction eliminates the previously required heat exchange apparatus and also eliminates the process limitation previously present where it was necessary to remove heat from the gasification vessel.

It should be understood in the following discussion that the term "gasification" refers to the reaction of hydrogen and steam with carbonaceous material to produce mixtures of hydrogen, carbon monoxide and methane. It is also to be understood in my process that some steam will pass through the gasification vessel unreacted. This unreacted steam will, however, absorb heat in the gasification vessel by virtue of its increase in sensible heat.

From the standpoint of economics, the steam-iron process provides a relatively inexpensive means of obtaining hydrogen for the gasification process. The steam-iron process usually includes a producer gas generator that produces a gas mixture comprising carbon monoxide, hydrogen and nitrogen by means of the reaction of solid carbonaceous material with steam and air at essentially atmospheric pressure but, in this instance, advantageously at elevated pressures of between 500 and 3,000 p.s.i.g. The producer gas is fed into a reductor vessel where the gas reacts with mixtures of iron oxides to reduce the same to metallic iron. The metallic iron, at an elevated temperature, is fed into an oxidizer vessel where it reacts with steam. The metallic iron is oxidized by the steam and hydrogen gas is produced. It was the procedure in the past to react the metallic iron with steam at low pressures and high temperatures. The hydrogen gas thus generated would be next subjected to a heat exchange treatment wherein the hydrogen would be cooled to a relatively low temperature condensing the residual unreacted steam. The hydrogen gas would then be subjected to a clean-up treatment in conventional dedusting equipment and then pressurized by means of a compressor or the like to a pressure substantially the same as that of the process vessel in which it was to be used, in this case the gasification vessel. One of the prerequisites for efficient hydrogenation of solid carbonaceous material is that the gasification reactor be at an elevated pressure of between 500 and 3,000 p.s.i.g. For this reason, the hydrogen withdrawn from the oxidizer vessel of the steam-iron process would be compressed to a pressure substantially the same as that of the gasification reactor. Before introducing the hydrogen into the gasification reactor, it would be necessary, if using the steam-iron process, to preheat the compressed hydrogen to an elevated temperature. It is readily apparent from the above that a considerable amount of process equipment was previously required to obtain hydrogen by means of the steam-iron process and to suitably prepare the hydrogen for introduction into the gasification reactor. In addition, it was necessary in the past to provide a lock hopper type for pressure feeding of the carbonaceous solids that were introduced into the producer gas generator. This lock hopper increased further the overall cost of the process.

I have discovered, by combining into a single unitary arrangement the gas producer, the reductor vessel and the oxidizer vessel of the steam-iron process and the gasification reactor, that it is now possible to eliminate a substantial portion of the processing equipment previously required in both the steam-iron process, hydrogen producer equipment and in the gasification reactor. I have discovered, by maintaining substantially the same pressure in the gas producer, the reductor, the oxidizer, and the gasification reactor, that it is no longer necessary to provide special pressure feed apparatus for the gas producer, such as lock hopper, and, further, it is no longer necessary to subject the gas withdrawn from the oxidizer to the cooling operation, the dedusting operation, compressing operation, and preheating operation before introducing the hydrogen gas into the gasification reactor.

My invention, therefore, includes a process for preparing a mixture of gases comprising hydrogen, carbon monoxide and methane by concurrently reacting steam and hydrogen with hydrocarbonaceous solids under substantially thermoneutral conditions wherein the pressures of the reactant vessels are all substantially the same, thereby eliminating a substantial amount of process equipment previously employed to treat the gases and solids prior to their reaction in the gasification reactor. The product gas obtained by my invention may be employed after further catalytic methanation of the carbon monoxide and hydrogen as a high B.t.u. gas suitable for use as in industrial or domestic heating gas. My invention further includes a means of obtaining a mixture of gases relatively rich in hydrogen and a process for separating the hydrogen and recycling the same to the gasification reactor if desired.

For a better understanding of my invention, there is illustrated in the figure a schematic diagram of a system adapted to carry out my invention.

Referring now to the figure, air at an elevated temperature and pressure is introduced into a gas producer vessel 10 through conduit 12. The air is compressed and preheated prior to its introduction into the gas producer 10, as will be later explained. Steam is also introduced into the gas producer 10 through conduit 14. Char or unreacted carbonaceous material is transferred from a gasification reactor 16 through conduit 18 into the gas producer 10. Both the gasification reactor 16 and the gas producer 10 are maintained at substantially the same elevated pressure of between 500 and 3,000 p.s.i.g.

The steam and air react with the carbonaceous material in the gas producer 10 to form producer gas which contains hydrogen, carbon monoxide and nitrogen. The producer gas is withdrawn from the gas producer vessel 10 through conduit 20 and passes through a heat exchanger 22. The incoming air entering the gas producer vessel through conduit 12 is preheated in the heat exchanger 22 by means of a countercurrent heat exchange relation between the producer gas withdrawn from producer vessel 10 and the incoming air. The cooled producer gas is then transported through conduit 24 to a reductor vessel 26.

Where desired, a portion of the producer gas transported through conduit 24 may be diverted through conduit 25 to a gas clean-up device 27 of conventional construction. In the clean-up device 27, at least a portion of the water and carbon monoxide is removed from the producer gas so that the reaction in the steam-iron process will take place with greater efficiency. The cleaned producer gas is conveyed through conduit 31 to conduit 24. It should be noted, however, where clean-up device 27 is employed, that the cleaning operation of the gas takes place at substantially the same pressure as that of the gas in the conduit 24.

The steam-iron process employs metal and metal oxides as the gas producing reactant. The reductor vessel 26 contains an inventory of metal, metal oxides and mixtures of the same. For example, the reductor vessel 26 may contain an inventory of metallic iron, Fe, and various iron oxides such as FeO and $Fe_3O_4$. The reductor vessel 26 is in direct communication with the gas producer 10 by means of conduit 20, heat exchanger 22 and conduit 24. Thus, both the reductor vessel 26 and the gas producer 10 are at substantially the same pressure—in this instance, at a pressure of between 500 and 3,000 p.s.i.g.

The iron oxides in reductor vessel 26 react with the producer gas at elevated temperatures of up to about 2,000° F. to reduce the iron oxides to metallic iron. The spent producer gas leaves the reductor vessel 26 through conduit 28 and is cooled in heat exchange apparatus 30 which may be a waste heat boiler or the like. The spent producer gas is transferred through conduit 32 from the heat exchange apparatus 30 to a gas clean-up device 34 where entrained solids are removed therefrom. The cleaned spent producer gas is conveyed from the gas clean-up device 34 through conduit 36 to an expander compressor generally designated by the numeral 38. Residual carbon monoxide and hydrogen in the spent producer gas could be utilized by burning with air in any conventional heat recovery equipment desired, either before or after expansion.

The energy of the spent producer gas is utilized in expander compressor 38 to compress air entering through conduit 40 which is then conveyed through conduit 42 at pressures up to or equal to the pressure in gas producer vessel 10. The air from conduit 42 enters heat exchange apparatus 22 where it is heated by means of the producer gas leaving the producer vessel 10 and the heated air is then conveyed through conduit 12 to gas producer 10.

Referring again to the reductor vessel 26, the metallic iron is withdrawn therefrom at an elevated temperature of up to about 2,000° F. and conveyed by means of conduit 44 to the oxidizer vessel 46. The reductor vessel 26 is in open communication with oxidizer vessel 46 by means of conduit 44 and is therefore at substantially the same pressure as reductor vessel 26 and gas producer vessel 10.

By maintaining a solids leg in line 44, it is possible to operate vessel 46 at a slightly higher pressure by a few pounds per square inch than in vessel 16. This slight pressure differential will be only enough to cause the mixture of hydrogen and steam to flow to vessel 16. It should be understood that, when it is stated that the vessels of the system are at "substantially the same pressure," it is meant that only a small differential pressure exists between these vessels necessary to insure the flow of process gas.

Steam is introduced into oxidizer vessel 46 through conduit 48 and moves upwardly through oxidizer vessel 46 in countercurrent flow to the metallic iron particles moving downwardly therein. The steam entering oxidizer vessel 46 reacts with the metallic iron to oxidize the same and form hydrogen gas. The iron oxides are withdrawn from the bottom of the oxidizer vessel 46 through conduit 50 and conveyed by means of a lift gas or the like through conduit 50 to the reductor vessel 26 where the iron oxides are again reduced to metallic iron. Steam can be conveniently used as a lift gas and, after separation from the iron solids at the top of vessel 26, it can be combined with the steam fed through conduit 48 and reused for oxidation of the iron.

The oxidizer vessel 46 and the gasification reactor 16 are in open communication with each other by means of conduit 52 and are, therefore, at substantially the same pressure, with the exception of the small pressure difference required to cause the gas to flow from vessel 46 to vessel 16 as previously explained—in this instance, at a pressure of between 500 p.s.i.g. and 3,000 p.s.i.g. Also the hydrogen and steam leaving the oxidizer vessel 46 at an elevated temperature substantially the same as the reaction temperature in the vessel 46 (between 1200° F. and 2000° F.) do not require preheating prior to its introduction into the gasification vessel 16.

Carbonaceous solids such as coal, lignite, char or the like are introduced into gasification reactor 16 through conduit 54. Although not illustrated, suitable pressure retaining means are provided in conduit 54 to maintain the desired pressure within the gasification reactor 16 while the carbonaceous solids are continuously introduced into the reactor 16. The hydrogen entering the gasification vessel 16 reacts with the carbonaceous solids to form methane gas. The steam entering through conduit 52 reacts with the carbonaceous solids to form carbon monoxide and hydrogen. Suitable control means may be provided in conduit 48 to control the amount of steam entering the oxidizer vessel 46 so that the reaction in the gasification reactor 16 is approximately thermoneutral.

The unreacted portion of the solid carbonaceous material is withdrawn from the gasification reactor 16 through conduit 18 and is conveyed to the gas producer 10 where it reacts with the steam and air as previously described. The gasification reactor 16 and the gas producer vessel 10 are in open communication with each other by means of conduit 18 and both are at substantially the same pressure that is between 500 p.s.i.g. and 3,000 p.s.i.g. With this arrangement, pressure retaining means such as lock hoppers and the like are no longer required as a means of introducing carbonaceous material into the gas producer vessel 10. Further, the char entering gas producer 10 from the gasification reactor 16 is at an elevated temperature which facilitates the reaction in the gas producer vessel 10.

The gas produced in the gasification reactor 16 is withdrawn therefrom through conduit 56 and introduced into a waste heat boiler 58 where heat is removed from the gas in the form of steam or the like. The cooled product gas is then conveyed from heat exchanger 58 to a gas purification process 62 through conduit 60. In the gas purification process, undesirable gases such as carbon dioxide and hydrogen sulfide are removed therefrom by conventional processes such as amine scrubbing, water scrubbing, or hot carbonate purification. The gas may take alternate paths from the gas purification process 62 in that it is optional to introduce the gas into a hydrogen separation and recovery device 64 by means of conduit 66 where the hydrogen may be separated from the product gas and recycled to the gasification reactor 16 by means of conduit 68. The hydrogen gas may also be used in other nonrelated processes where hydrogen is a constituent. In the event hydrogen is separated from the product gas, the remaining gas mixture can be utilized in further chemical synthesis or treated to increase its B.t.u. content and then transmitted to its ultimate destination for combustion as a heating gas. If the hydrogen is recycled to the gasification reactor 16 by means of conduit 68, it should be introduced into the lower portion of the reactor 16 while the steam and hydrogen are introduced through the conduit 53 into the reactor above the point at which the hydrogen is so introduced. The efficiency of the gasification reactor 16 would, therefore, be improved in that the least reactive carbonaceous material would be subjected to relatively pure hydrogen for reaction therewith.

In some cases, it may be advantageous to incorporate also a conventional carbon monoxide shift reactor to adjust the hydrogen to carbon monoxide ratio to that desired for further processing. Thus, the injection of steam will produce more hydrogen in accordance with the reaction: $H_2O \rightarrow H_2 + CO_2$. The additionally produced hydrogen can be separated and recycled as described above or used to catalytically hydrogenate residual carbon monoxide.

Alternatively, the purified gas mixture may be conveyed from the purification apparatus 62 through conduit 70 to a catalytic methanation reactor 72 where, by the use of conventional iron or nickel catalysts, the hydrogen and carbon monoxide are converted to methane. In this manner, the B.t.u. content of the gas is increased and the gas is suitable as a heating gas for both domestic and industrial uses. The high B.t.u. product gas is withdrawn from the catalytic methanation reactor 72 through conduit 74 may be conveyed by pipeline to its ultimate destination for combustion as a supplemental source of heating gas.

It is also within the scope of my invention to separate the various gases in the mixture of my product gas for use in other processes.

The schematic representation of my process illustrated in the drawing is intended only as a flow sheet to assist in understanding my invention. Pumps, valves and the like have been purposely omitted to present the essentials of my invention in its simplest form and it is not intended thereby to imply that conventional control equipment is not required to practice my invention. It is readily apparent to those skilled in the art where such conventional control devices are required.

For a better understanding of the invention, the following equations set forth certain of the chemical reactions that take place in the gasification reactor 16. The exothermic properties of the hydrogenation reaction and endothermic properties of the water gas reaction are evident from the following reaction:

$$2H_2 + C \rightleftharpoons CH_4 \Delta H: -39{,}500 \text{ B.t.u./lb. mol}$$
$$H_2O + C \rightleftharpoons H_2 + CO \Delta H: +58{,}420 \text{ B.t.u./lb. mol}$$

The following example is illustrative of how my invention may be practiced.

Char at a temperature of about 1500° F. is withdrawn from gasifier vessel 16 and introduced into gas producer 10. Steam and air react with the char at a pressure of about 1,000 p.s.i.g. in gas producer 10 to form producer gas having the following approximate composition:

15% hydrogen
25% CO
49% $N_2$
5% $CO_2$
6% $H_2O$

The producer gas at an approximate temperature 1500° F. and pressure of 990 p.s.i.g. is introduced into the reductor 26 where it reacts with iron oxide at a temperature of about 1500° F. and pressure of about 990 p.s.i.g. to reduce the iron oxides to metallic iron. The spent producer gas comprises $H_2$, CO, $H_2O$, $CO_2$ and $N_2$. The metallic iron is introduced into oxidizer 46 where it reacts with excess steam at a temperature of about 1500° F. and a pressure of about 1,010 p.s.i.g. to produce hydrogen gas and steam. The gaseous product leaving oxidizer 46 contains approximately 40% $H_2$ and 60% steam at a temperature of about 1500° F. and a pressure of about 1,010 p.s.i.g. The relative ratio of steam and hydrogen in the product gas withdrawn from oxidizer 46 can be readily regulated by controlling the amount of excess steam introduced into oxidizer 46. A chemical thermodynamic limitation is imposed upon the system that limits the maximum percentage of hydrogen to 40–50%. The temperature of the reaction in gasifier 16 can be controlled by controlling the temperature of the steam fed to oxidizer 46.

In the gasifier, the steam-carbon reaction being endothermic serves as a coolant for the exothermic hydrogenation reaction. The steam and hydrogen at a temperature of about 1500° F. and a pressure of about 1,000 p.s.i.g. are introduced into the gasification vessel 16 and react with the carbonaceous solids therein at a pressure of about 1,000 p.s.i.g. and an initial temperature of about 1500° F. As is well known, steam will not react with carbon at a temperature below approximately 1650° F. However, the exothermic reaction between carbon and hydrogen will raise the temperature of reaction within the vessel 16 to a value such that the reaction between carbon and steam will occur. The product gas withdrawn from the gasification vessel 16 has approximately the following composition:

32% $H_2$
14% CO
28% $CH_4$
18% $H_2O$
8% $CO_2$

The CO and $H_2$ in the product gas from gasifier 16 can be converted to $CH_4$ in methanation unit 72 to provide a high B.t.u. gas having the approximate composition as follows:

5.0% $H_2$
0.1% CO
93.9% $CH_4$
1.0% $CO_2$

It should be understood that the above example is exemplary only and other pressures and temperatures may be employed within the scope of my invention.

According to the provisions of the patent statutes, I have explained the principle, preferred construction and mode of operation of my invention and have illustrated and described what I now consider to represent its best embodiment. However, I desire to have it understood that the invention may be practiced otherwise within the scope of the appended claims.

I claim:

1. A process for preparing a mixture of gases comprising hydrogen, carbon monoxide and methane which comprises, reacting an oxidizable metal with steam at an elevated pressure to produce a first gas mixture consisting essentially of hydrogen and steam, and thereafter reacting said gas mixture with carbonaceous solids at substantially the same elevated pressure and at a temperature in excess of approximately 1650° F. to produce a second gas mixture having a high B.t.u. content containing hydrogen, carbon monoxide and methane.

2. A process for preparing a mixture of gases comprising hydrogen, carbon monoxide and methane from carbonaceous solids which comprises, reacting an oxidizable metal with steam at an elevated pressure and elevated temperature to produce a first gas mixture consisting essentially of hydrogen and steam in a first zone, transferring said first gas mixture from said first zone to a second zone at said elevated temperature and pressure, and reacting said first gas mixture at substantially the same elevated pressure and at a temperature in excess of approximately 1650° F. with carbonaceous solids in said second zone to produce a second gas mixture having a high B.t.u. content containing hydrogen, carbon monoxide and methane.

3. A process for preparing high B.t.u. content gas from carbonaceous solids which comprises, reacting a member of the class consisting of iron, iron oxides and mixtures thereof with steam in a first gas generating zone to produce a first gas mixture consisting essentially of hydrogen and steam, said first gas generating zone being at an elevated pressure of between about 500 p.s.i.g. and 3000 p.s.i.g. transferring said first gas mixture from said first gas generating zone to a second gas generating zone at said elevated pressure, and reacting said first gas mixture at substantially the same elevated pressure of between about 500 p.s.i.g. and 3000 p.s.i.g. and at a temperature in excess of approximately 1650° F. with carbonaceous solids in said second gas generating zone to produce a mixture of gases having a high B.t.u. content containing methane.

4. A process for preparing high B.t.u. gas from carbonaceous solids which comprises, reacting steam and air with carbonaceous solids in a first gas generating zone at an elevated pressure of between about 500 p.s.i.g. and 3000 p.s.i.g. to produce a gas mixture comprising hydrogen and carbon monoxide, reacting said gas mixture with iron oxide at the same pressure of between about 500 p.s.i.g. and 3000 p.s.i.g. to reduce at least a portion of said iron oxides to metallic iron, reacting said iron with a sufficient quantity of steam at the same pressure of between about 500 p.s.i.g. to about 3000 p.s.i.g. to produce a second gas mixture consisting essentially of hydrogen and steam, and reacting said second gas mixture with carbonaceous solids at the same pressure of about 500 p.s.i.g. to about 3000 p.s.i.g. and at a temperature in excess of approximately 1650° F. to produce a mixture of gases having a high B.t.u. content containing methane.

5. A process for preparing high B.t.u. gas from carbonaceous solids which comprises, providing an oxidizer zone and a gasification zone, maintaining substantially the same gas pressure of between 500 p.s.i.g. and 3000 p.s.i.g. in said oxidizer zone and said gasification zone, reacting a member of the class consisting of iron, iron oxides and mixtures thereof with steam in said oxidizer zone to produce a gas mixture consisting essentially of hydrogen and steam, transferring said gas mixture directly from said oxidizer zone to said gasification zone and reacting said gas mixture with carbonaceous solids in said gasification zone at a temperature in excess of 1650° F. to produce a mixture of gases having a high B.t.u. content containing methane.

6. A process for preparing a mixture of gases comprising hydrogen, carbon monoxide and methane which comprises, providing a gas producer zone, a reductor zone, an oxidizer zone, and a gasification zone, maintaining all of said zones at substantially the same elevated pressure of between 500 p.s.i.g. and 3000 p.s.i.g., reacting steam and air with carbonaceous solids in said gas producer zone to form producer gas, transferring said producer gas from said gas producer zone to said reductor zone at said elevated pressure, reacting said producer gas with metal oxides in said reductor zone to reduce at least a portion of said metal oxides to metals, introducing said metals into said oxidizer zone, introducing steam into said oxidizer zone and reacting said metals with said steam to produce a gas mixture consisting essentially of hydrogen and steam, transferring said gas mixture from said oxidizer zone to said gasification zone at said elevated pressure and reacting at a temperature in excess of 1650° F. and gas mixture with carbonaceous solids in said gasification zone to produce a second gas mixture having a high B.t.u. content containing hydrogen, carbon monoxide and methane.

7. A process for preparing a mixture of gases comprising hydrogen, carbon monoxide and methane which comprises, providing a gas producer zone, a reductor zone, an oxidizer zone, and a gasification zone, maintaining all of said zones at substantially the same elevated pressures of between about 500 p.s.i.g. and 3000 p.s.i.g., reacting steam and air with carbonaceous solids in said gas producer zone to form producer gas, transferring said producer gas from said gas producer zone to said reductor zone at said elevated pressure, reacting said producer gas with metal oxides in said reductor zone to reduce said metal oxides to metals, introducing said metals into said oxidizer zone, introducing steam into said oxidizer zone and reacting said metals with said steam to produce a gas mixture consisting essentially of hydrogen and steam, transferring said gas mixture from said oxidizer zone to said gasification zone at said elevated pressure, reacting said gas mixture with carbonaceous solids in said gasification zone to produce a second gas mixture having a high B.t.u. content containing hydrogen, carbon monoxide, and methane, separating at least a portion of said hydrogen from said second gas mixture, and introducing said hydrogen into said gasification zone.

References Cited by the Examiner

UNITED STATES PATENTS

| | | | |
|---|---|---|---|
| 2,449,635 | 9/1948 | Barr | 23—214 |
| 2,640,034 | 5/1953 | Jones | 23—214 XR |
| 2,888,395 | 5/1959 | Henny | 48—197 |
| 2,942,959 | 6/1960 | Rees et al. | 48—197 |

MORRIS O. WOLK, *Primary Examiner.*

MAURICE A. BRINDISI, DELBERT E. GANTZ,
*Examiners.*